United States Patent [19]

Froidevaux

[11] Patent Number: 5,239,866
[45] Date of Patent: Aug. 31, 1993

[54] SENSOR FOR MEASURING A PHYSICAL PARAMETER

[75] Inventor: Raymond Froidevaux, Boudry, Switzerland

[73] Assignee: Asulab S.A., Bienne, Switzerland

[21] Appl. No.: 760,395

[22] Filed: Sep. 16, 1991

[30] Foreign Application Priority Data

Sep. 17, 1990 [FR] France .................. 90 11530

[51] Int. Cl.$^5$ .................. G01L 1/04; G01P 15/00; G01D 11/10; G01D 11/30
[52] U.S. Cl. .................. 73/430; 73/526; 73/862.639
[58] Field of Search .................. 73/866.5, 866.1, 430, 73/493, 496, 526, 514, 517 R, 707, 753, 522, 862.621, 862.629, 862.632, 862.633, 862.634, 862.636, 862.637, 862.638, 862.639

[56] References Cited

U.S. PATENT DOCUMENTS

| | | | |
|---|---|---|---|
| 4,032,733 | 6/1977 | Meiserheimer, Jr. | 73/517 R X |
| 4,091,885 | 5/1978 | Oxley | 177/188 |
| 4,104,921 | 8/1978 | Nissl | 73/517 R |
| 4,173,725 | 11/1979 | Asai et al. | 310/325 |
| 4,188,612 | 2/1980 | Kerr | 310/329 X |
| 4,306,456 | 12/1981 | Maerfeld | 73/DIG. 4 X |
| 4,393,950 | 7/1983 | Klopfenstein et al. | 177/108 |
| 4,872,342 | 10/1989 | Hanson et al. | 73/517 R |
| 4,882,933 | 11/1989 | Petersen et al. | 73/517 R |
| 5,017,743 | 5/1991 | Gunning et al. | 200/61.45 R |

FOREIGN PATENT DOCUMENTS

| | | |
|---|---|---|
| 0247247 | 12/1987 | European Pat. Off. . |
| 0373040 | 6/1990 | European Pat. Off. . |
| 1817946 | 10/1974 | Fed. Rep. of Germany . |
| 2176607 | 12/1986 | United Kingdom . |

OTHER PUBLICATIONS

Article entitled "Tensometric accelerometers with overload protection" by L. M. Moskalik, *Measurement Techniques*, vol. 22, No. 12, pp. 1469-1471, Dec. 1979.

*Primary Examiner*—Tom Noland
*Attorney, Agent, or Firm*—Pollock, Vande Sande & Priddy

[57] ABSTRACT

A measurement sensor is disclosed having a frame, a support which is resiliently flexible under the influence of a physical parameter and is fixed to the frame, a mass connected to the support, a housing which is formed by the frame and surrounds the mass to dampen movement of the mass and its support, a detection device for supplying a signal representative of the physical parameter in response to flection of the support. The sensor includes an assembly for precisely positioning the mass in the housing. The sensor has applications in the measurement of a physical parameter such as, for example, acceleration.

18 Claims, 2 Drawing Sheets

SENSOR FOR MEASURING A PHYSICAL PARAMETER

FIELD OF THE INVENTION

The invention relates to sensors for measuring a physical parameter.

More specifically it relates to a sensor provided with a support which is resiliently flexible under the influence of external stress, such as for example acceleration, and which is in particular adapted to receive detection means responsive to this stress.

DESCRIPTION OF THE PRIOR ART

Sensors provided with flexible supports of this type are already known. Sensors of this type have been used for a long time in instruments measuring forces, such as balances, or in means for measuring other physical quantities such as pressure or acceleration. The latter applications have, moreover, proved very valuable in the automotive field where these sensors are located in suitable parts of a vehicle to measure the accelerations undergone by the latter and to consequently modify certain parameters or trigger various safety devices.

In their simplest form, sensors of this type comprise a flexible support substantially having the shape of a beam of rectangular section, this beam being fixed in an overhanging manner onto a frame. This flexible support which is designed to deflect along at least one sensitive axis in response to external stress has a transducer. This transducer is fixed to a large face of the flexible support equidistant from one or other of its extremities. When the beam is flexed, the transducer, which is for example composed of a quartz resonator in the shape of a double tuning fork, sends a signal in the form of a frequency variation towards a signal treatment circuit. One or more other transducers are often used to reduce the effects of interference (temperature).

In the case of measurement sensors acting as an acceleration meter, the beam has at its free extremity a mass which, under the influence of the acceleration, flexes the support as it moves.

To obtain reliable and exact measurements with an acceleration meter of this type it is necessary to equip it with damping means which make it possible to suppress a peak appearing at the resonance frequency $F_0$ of the system.

Of the solutions which make it possible to eliminate this resonance peak, one particularly economical solution consists of locating the mass in a housing integral with the frame to create pneumatic damping by passage of a fluid between two chambers provided in this housing.

To create the most effective damping possible a very small play of the order of 0.1 mm ($0.1 \cdot 10^{-3}$ meters) is provided between the mass and the inside wall of the housing.

It follows that it is extremely difficult, during assembly, to assemble the beam together with its mass on the frame sufficiently precisely so that the latter can move freely in the housing without risk of contacting the inside wall of the housing.

OBJECTS OF THE INVENTION

It is thus an object of the invention to overcome this disadvantage by providing a physical measurement sensor, the beam together with its mass of which can be precisely assembled to ensure reliable operation despite an extremely small play between the mass and the housing in which it is intended to move.

BRIEF SUMMARY OF THE INVENTION

The invention therefore relates to a sensor for measuring a physical parameter of the type comprising:
a frame,
at least one support which is resiliently flexible under the action of said physical parameter and which is integral with said frame,
at least one mass connected to said support,
at least one housing integral with said frame surrounding said mass to form damping means for the support-mass assembly,
at least one detection means integral with the support and capable of supplying a signal representative of said physical parameter in response to flexion of said support, whereby this sensor has means for positioning the mass in the housing.

These characteristics avoid any disturbance in the operation of the sensor due to unwanted friction of the mass against the inside wall of its housing resulting from the small play remaining between these elements. These features are all the more advantageous since disturbances of this type cannot be detected during assembly.

In one embodiment the positioning means are at least partly integral with the support.

In another embodiment, the positioning means comprise two relatively widely spaced opening-stud assemblies, each of these assemblies being provided on the one hand in the support and, on the other hand, in the frame.

BRIEF DESCRIPTION OF THE DRAWINGS

Other features and advantages of the present invention will emerge from study of the following detailed description of one embodiment of the invention, given by way of example, with reference to the accompanying drawings in which.

DETAILED DESCRIPTION OF THE INVENTION

Figure 1:
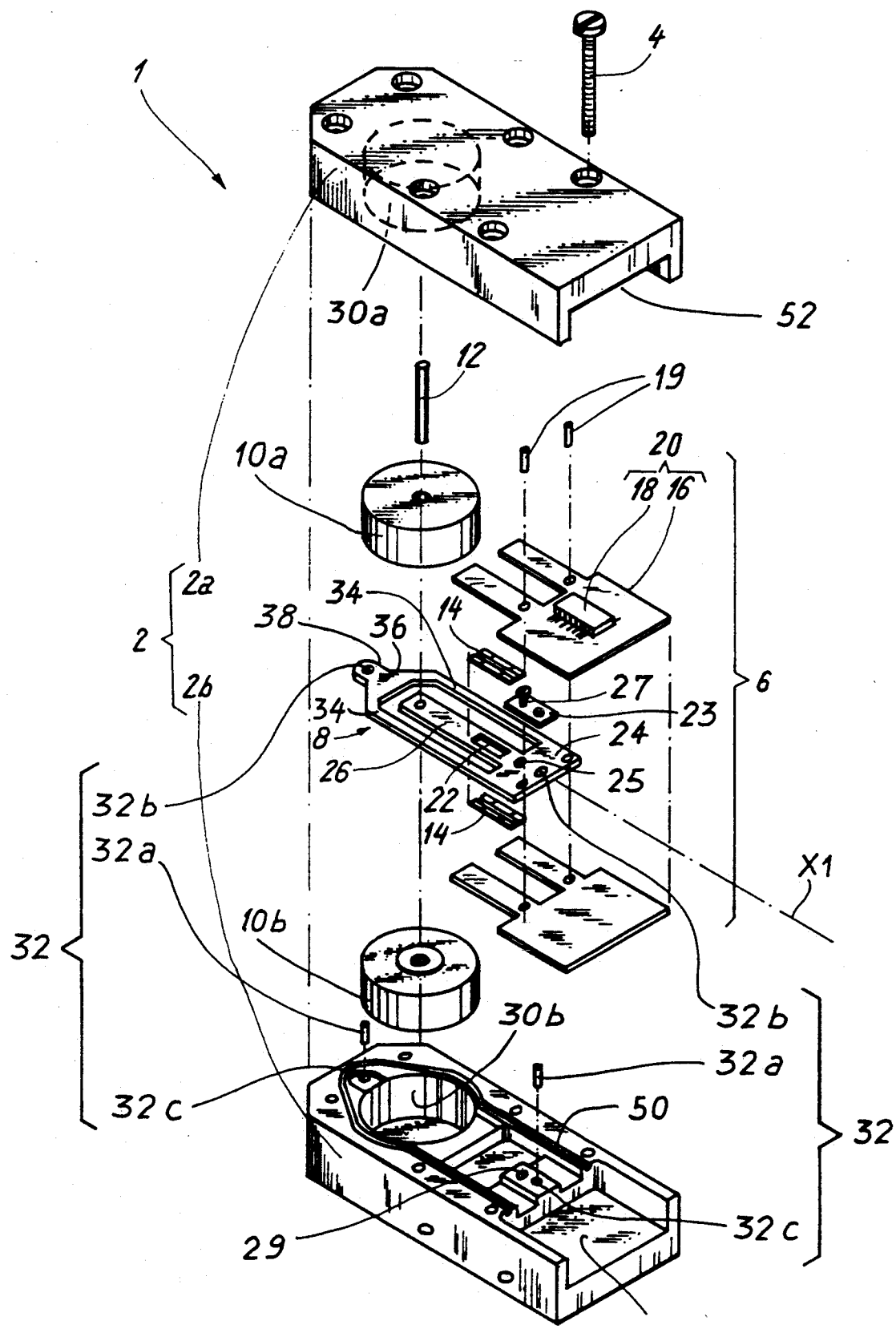
FIG. 1 is an exploded perspective view of a measurement sensor of the invention.

Referring firstly to FIG. 1, this shows a preferred embodiment of the measurement sensor of the invention designated by the general reference numeral 1.

This sensor 1 has a frame 2 which is composed of two shells, 2a and 2b respectively, of similar shape and designed to be assembled using fixing means, such as screws 4, only one of which has been shown here.

The frame 2 is adapted to receive a functional unit 6 which comprises a support 8 resiliently flexible under the influence of a physical parameter to be recorded or measured.

A mass composed of two half masses 10a and 10b connected together by an axle passing therethrough is firmly fixed to the support 8. The axle 12 passes through both sides of the support 8 which is sandwiched between the two half masses 10a and 10b.

The support 8 also has two detection means 14 composed, in the example shown, of two quartz resonators shaped like a double tuning fork mounted on both sides of the support 8.

Each resonator 14 is electrically connected to a corresponding printed circuit board 16 to which electronic components 18 are surface mounted, only one of which has been shown here. The elements 16 and 18 constitute an electronic circuit 20. The resonators 14 are connected in oscillating circuits, not provided with reference numerals, in a manner known per se, the resonance frequencies of which vary as a function of the flexion of the support 8. The oscillating circuits thus deliver signals which are treated and analysed in the electronic circuit 20. This delivers a variable signal as a function of the flexion of the support 8 and thus, in this example, of the acceleration undergone by the two half masses 10a and 10b.

This embodiment therefore consists of two printed circuit boards 16 arranged on both sides of the support 8 and fixed thereto by means of driven studs 19 or other similar means such as screws, not shown.

It should also be noted that at the site at which the resonators 14 are mounted, the support 8 has under each of its detection or resonating means 14 a corresponding aperture 22 permitting each resonator to vibrate freely.

The support 8 has a base 24 which is adapted to be mechanically fixed to the frame 2. Extending from this base 24 is a member 26 of substantially elongated shape which is particularly capable of resiliently flexing in relation to the base 24. This elongated member has the general shape of a beam of rectangular section, mounted in this example overhanging the frame 2.

The base 24 also comprises a passage opening 25 for fixing the support 8 onto the lower shell 2b of the frame 2. This fixing opening 25 is adapted to receive a screw 27 which engages directly in a threaded boring 29 provided in the shell 2b of the frame 2. Interposed between the screw 27 and the base 24 is a collar 23 which bears against the base 24 to coincide with the edge which projects from the elongated member or beam 26.

The measurement sensor of the invention also has damping means composed of blind housings 30a and 30b provided respectively in the shell 2a and in the shell 2b of the frame 2. Housings 30a and 30b are adapted to receive respectively one of the two half masses 10a, 10b the shape of each of which is notably complementary to that of the corresponding housing.

It should be noted that it is possible to use a mass made of a single piece or having more than two pieces, which may be any shape, such as for example cubic. In this case the housings 30a and 30b must be shaped accordingly. To achieve pneumatic type damping, only a small play is provided between the outer circumference of the mass and the inner wall of the housing, of the order of 0.1 mm ($0.1 \cdot 10^{-3}$ meter).

In accordance with the invention, to facilitate assembly of the functional unit 6 onto the frame 2, and hence of the half masses 10a and 10b in their respective housing 30a or 30b, the measurement sensor 1 has mass positioning means 32 in each housing 30a, 30b. The positioning means 32 are at least partly integral with the support 8 and they comprise two relatively widely spaced stud-opening assemblies 32b, 32c, each of these assemblies being provided on the one hand in the frame 2 and on the other hand in the support 8.

The two positioning means 32 are provided on a positioning axis X1 which coincides with the longitudinal axis of the beam 26.

In the example shown in FIG. 1, the studs 32a are pressed into corresponding openings 32c provided in the shell 2b of the frame 2, whereas two other openings 32b, which are each adapted to receive one of the studs 32a, are provided in the support 8. Two other openings, not shown and not provided with reference numerals, identical to the openings 32c are provided in the shell 2a of the frame 2 to receive the free extremities of the two studs 32a. The openings provided in the shell 2a are so positioned that they coincide axially with those of the shell 2b when these two shells 2a and 2b are assembled one on top of the other. It will be noted that in this embodiment the two shells 2a and 2b are identical in shape. In another embodiment the two 32a can be pressed directly into the openings 32b provided in the support 8. In other embodiments, not shown, these studs can be integral, either with one of the two shells 2a or 2b, or with the support 8.

The embodiment shown thus has two assemblies each having a stud 32a and three openings 32b, 32c. In another of the embodiments not shown, each assembly has a stud which is formed by two protuberances integral with the support extending coaxially on both sides thereof and which cooperate with two openings provided in the lower and upper shells of the support respectively. In yet another embodiment not shown, each assembly has two studs integral respectively with one of the shells of the frame and mounted coaxially opposite each other by engaging in the opening provided in the support. In this embodiment, each assembly has two studs and a single opening.

It will be noted that when all the parts of FIG. 1 are assembled, a first stud 32a-opening 32b assembly is integral with the base 24, whereas a second assembly is integral with two extensions 34 extending from the base 24. In this example the two extensions 34 are shaped like arms which extend parallel to the beam 26 in the direction of the free extremity thereof. The two arms 34 thus extend on both sides of the beam 26, substantially in the same plane, and they join each other above the free extremity of this bean to form a positioning frame thereabout.

Although it is not shown, it will be noted that the support 8 can only have a single arm 34 appropriately pierced at its free extremity by an opening forming the positioning opening 32b.

In the example shown, the two arms 34 are advantageously connected together by means of a support member 36 forming a junction between the two arms 34 which join each other in the proximity of and above the free extremity of the beam 26. This junction support member 36 has a protuberance 38 in which the positioning opening 32b is directly provided. The second stud 32a-opening 32b assembly is thus provided in the junction support member 36 of the two arms 34. Consequently, because the arms 34 as well as the openings 32b, the support member 36 and the protuberance 38 are integrally formed in the support 8, the positioning means, which also have the studs 32a and the corresponding openings 32c provided in the shells 2a and 2b, are at least partly integral with the support 8 and hence with the beam 26.

Figure 2:
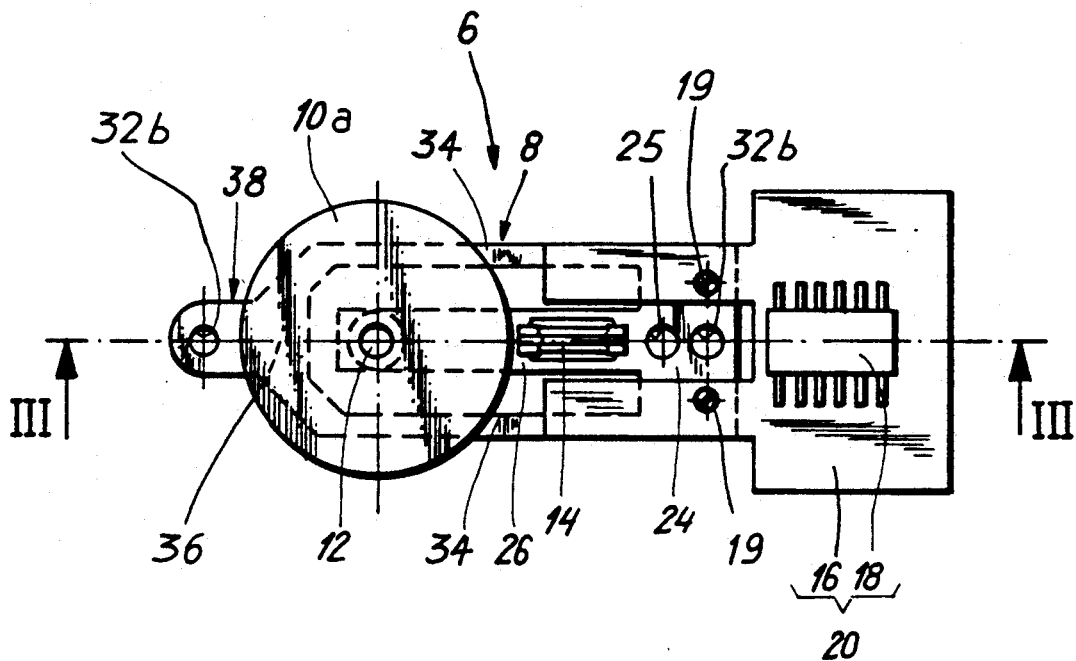
FIG. 2 is a view from above of a support of the sensor of FIG. 1 provided with various functional members and ready to be mounted on the frame.
Figure 3:
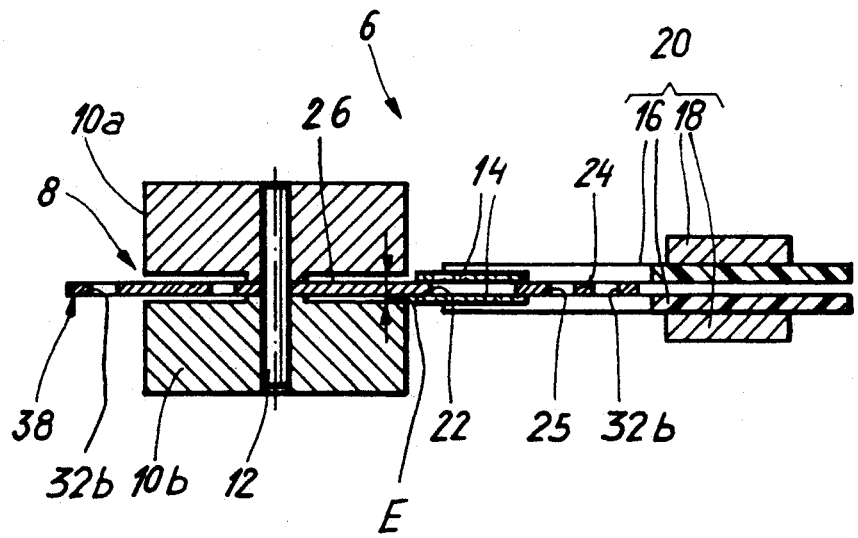
FIG. 3 is a sectional view along the line III—III of FIG. 2.

Referring now to FIGS. 2 and 3, it will be noted that the two arms or extensions 34 as well as the support member 36 are partially located in a space E left between the two half masses 10a and 10b. In extending between and under the two half masses 10a and 10b, these two arms 34 and the support member 36 thus occupy a minimum space and do not increase the dimensions of the sensor of the invention.

It should also be noted that the support 8 provided with its positioning means is made in a single piece obtained by stamping, for example cold stamping, so that the positioning means of the invention, and notably the arms 34, the junction support member 36 and the openings 32b are preferably obtained in a single manufacturing step and at the same time as the manufacture of the beam 26 associated with its base 24. It will be noted that the support 8 can therefore easily be cut in continuous manner from a metal band.

To ensure the tightness of the sensor 1, a seal, not shown, is located in a recess 50, provided for example in the shell 2b. When the sensor 1 is fitted, a liquid seal such as a silicon resin is poured into a housing 52 provided in two parts on each shell 2a, 2b to receive the electronic circuit 20.

What is claimed is:

1. A measurement sensor for measuring a physical parameter, said sensor comprising:
    a frame defining a housing;
    at least one mass;
    support means for freely suspending said mass in said housing, said support means comprising at least one elongated beam having a base adapted to be mechanically secured to the frame and a free extremity supporting said mass in an overhanging manner, said elongated beam being resiliently flexible under the influence of said physical parameter, and said housing being arranged to surround said mass so as to dampen the movement thereof;
    at least one detection means fixed to said elongated beam for supplying a signal representative of said physical parameter in response to flection of said beam; and,
    means for positioning said mass in said housing, said positioning means having a first end engaging the base of said elongated beam and a second end precisely secured to the frame in the proximity of and beyond the free extremity of said elongated beam.

2. A measurement sensor according to claim 1, wherein said positioning means comprises two widely spaced stud-opening assemblies respectively associated with said first end and said second end of the positioning means.

3. A measurement sensor according to claim 2, wherein said stud-opening assemblies are provided on a positioning axis which coincides with a longitudinal axis of the elongated beam.

4. A measurement sensor according to claim 2, wherein said positioning means comprises two arm extensions each having a first end and a second end, wherein said first ends are connected to said base and said second ends are connected together by a support member, and wherein said base and said support member are each attached to the frame through a corresponding one of said stud-opening assemblies.

5. A measurement sensor according to claim 4, wherein said two arm extensions form a positioning frame about said elongated beam.

6. A measurement sensor according to claim 5, wherein said two arm extensions extend on opposite sides of said elongated beam.

7. A measurement sensor according to claim 1, wherein a portion of said positioning means is located in a space arranged within the mass.

8. A measurement sensor according to claim 1, wherein said positioning means and said elongated beam extend substantially in the same plane.

9. A measurement sensor according to claim 1, wherein the positioning means comprises at least one arm extension extending substantially parallel to said elongated beam.

10. A measurement sensor according to claim 1 wherein the positioning means comprises two arm extensions connected together by a support member which forms a junction between said two arm extensions and is attached to the frame.

11. A measurement sensor according to claim 10, wherein said two arm extensions form a positioning frame about said elongated beam.

12. A measurement sensor according to claim 11, wherein the two arm extensions extend on opposite sides of the elongated beam.

13. A measurement sensor according to claim 10, wherein said positioning means comprises two widely spaced stud-opening assemblies respectively associated with said first end and said second end of the positioning means, and wherein said support member is attached to the frame through one of said stud-opening assemblies.

14. A measurement sensor according to claim 13, wherein said two arm extensions form a positioning frame about said elongated beam.

15. A measurement sensor according to claim 14, wherein said two arm extensions extend on opposite sides of said elongated beam.

16. A measurement sensor according to claim 1, wherein said mass is dampened without frictional contact between said mass and said housing.

17. A measurement sensor according to claim 1, wherein said mass is dampened pneumatically.

18. A measurement sensor according to claim 1, wherein said positioning means comprises two arm extensions each having a first end and a second end, wherein said first ends are connected to said base and said second ends are connected together by a support member, and wherein at least one of said base and said support member is attached to the frame through a stud-opening assembly.

* * * * *